(12) United States Patent
Wilhite

(10) Patent No.: US 8,655,267 B2
(45) Date of Patent: Feb. 18, 2014

(54) ADAPTIVE RANGE EXTENDER FOR EXTENDING A RANGE OF A CELLULAR NETWORK BY AMPLIFYING UPLINK AND DOWNLINK CELLULAR SIGNALS

(75) Inventor: Peter E. Wilhite, Medical Lake, WA (US)

(73) Assignee: Clear RF LLC, Spokane Valley, WA (US)

( * ) Notice: Subject to any disclaimer, the term of this patent is extended or adjusted under 35 U.S.C. 154(b) by 479 days.

(21) Appl. No.: 12/958,150

(22) Filed: Dec. 1, 2010

(65) Prior Publication Data

US 2012/0142269 A1 Jun. 7, 2012

(51) Int. Cl.
*H04B 3/36* (2006.01)

(52) U.S. Cl.
USPC ........................................ 455/7; 455/9; 455/10

(58) Field of Classification Search
USPC ............. 455/7, 39, 67.11, 11.1, 25, 348, 502, 455/3.02, 271, 233, 227, 15, 343.2, 574, 455/522, 69, 450; 375/149, 147, 326, 344, 375/324, 345, 211, 297; 370/203, 208, 278, 370/280, 282, 286, 352, 400, 519, 315, 318, 370/252

See application file for complete search history.

(56) References Cited

U.S. PATENT DOCUMENTS

| | | | | |
|---|---|---|---|---|
| 4,851,842 A * | 7/1989 | Iwamatsu | ...................... | 341/139 |
| 5,835,848 A * | 11/1998 | Bi et al. | ........................... | 455/24 |
| 2005/0118949 A1 * | 6/2005 | Allen et al. | .................. | 455/13.4 |
| 2008/0014863 A1 * | 1/2008 | Van Buren et al. | ............... | 455/7 |
| 2008/0076437 A1 * | 3/2008 | Wilson et al. | ................. | 455/450 |

* cited by examiner

*Primary Examiner* — Edward Urban
*Assistant Examiner* — Golam Sorowar
(74) *Attorney, Agent, or Firm* — Wolfe-SBMC

(57) ABSTRACT

In one or more embodiments, a cellular signal is received and amplified by a particular amount of gain. A power level of the amplified cellular signal is measured and compared to a power level threshold. The particular amount of gain is adjusted based on the comparison to alter the power level of the amplified cellular signal by less than 1 dB. The cellular signal having the altered power level is then transmitted.

17 Claims, 6 Drawing Sheets

ADAPTIVE RANGE EXTENDER FOR EXTENDING A RANGE OF A CELLULAR NETWORK BY AMPLIFYING UPLINK AND DOWNLINK CELLULAR SIGNALS

BACKGROUND

Booster amplifiers are commonly used to extend the range of a cellular network. By amplifying uplink and/or downlink cellular signals between a mobile station and base station, a booster amplifier can extend the range of a wireless network. Booster amplifiers however, typically amplify cellular signals in an unsophisticated manner making crude adjustments that are slow, coarse, and/or disproportionate to network conditions. These crude adjustments can result in a variety of problems including link imbalances, amplifier oscillations, and dropped calls as the booster amplifier improperly amplifies the cellular signals.

SUMMARY

This summary is provided to introduce a selection of concepts in a simplified form that are further described below in Detailed Description. This summary is not intended to identify key features or essential features of the claimed subject matter, nor is it intended to be used to limit the scope of the claimed subject matter.

In one or more embodiments, a cellular signal is received and amplified by a particular amount of gain. A power level of the amplified cellular signal is measured and compared to a power level threshold. The particular amount of gain is adjusted based on the comparison to alter the power level of the amplified cellular signal by less than 1 dB. The cellular signal having the altered power level is then transmitted.

In other embodiments, a cellular signal is received and amplified by a particular amount of gain. A load on a power supply associated with the amplified cellular signal is ascertained and the load on the power supply is compared to a power supply load threshold. The particular amount of gain is then adjusted based on the comparison of the load on the power supply and the power supply load threshold.

BRIEF DESCRIPTION OF THE DRAWINGS

The same numbers are used throughout the drawings to reference like features.

DETAILED DESCRIPTION

Overview

In one or more embodiments, a cellular signal is received and amplified by a particular amount of gain. A power level of the amplified cellular signal is measured and compared to a power level threshold. The particular amount of gain is adjusted based on the comparison to alter the power level of the amplified cellular signal by less than 1 dB. The cellular signal having the altered power level is then transmitted.

In other embodiments, a cellular signal is received and amplified by a particular amount of gain. A load on a power supply associated with the amplified cellular signal is ascertained and the load on the power supply is compared to a power supply load threshold. The particular amount of gain is then adjusted based on the comparison of the load on the power supply and the power supply load threshold.

In the discussion that follows, a section entitled "Operating Environment" is provided and describes one example operating environment in which one or more embodiments can be deployed. Following this, a section entitled "Example Device" is provided and gives an example of an adaptive range extender in accordance with one or more embodiments. Last, a section entitled "Example Methods" describes example methods in accordance with one or more embodiments.

Operating Environment

Figure 1:
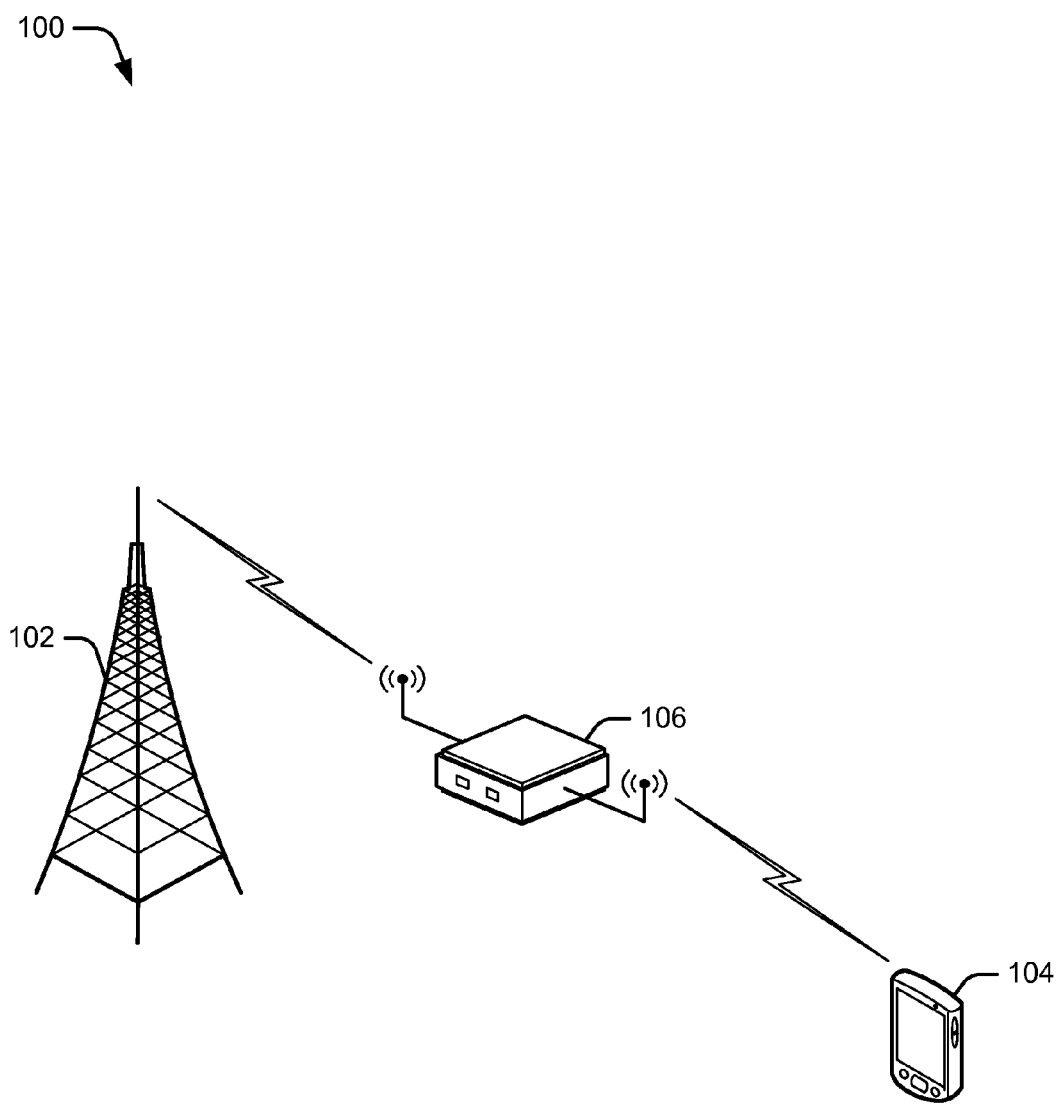
FIG. 1 illustrates an example operating environment in accordance with one or more embodiments.

FIG. 1 illustrates an example operating environment in accordance with one or more embodiments generally at 100. Operating environment includes a base station 102, mobile station 104, and adaptive range extender 106. In the illustrated and described embodiments, base station 102, mobile station 104, and extender 106 can work in connection with any suitable wireless or cellular system. By way of example and not limitation, base station 102 can provide cellular service for Global System for Mobile Communications (GSM) and/or Code Division Multiple Access (CDMA) based technologies such as Evolution Data Optimized (EVDO) and/or High Speed Packet Access (HSPA).

In at least some instances, base station 102 supports multiple generations of cellular technologies including fourth generation technologies such as 3G Long-Term Evolution (LTE) and/or Worldwide Interoperability for Microwave Access (WiMax). Alternately or additionally, in at least some instances, base station 102 can support legacy GSM and/or CDMA technologies.

Base station 102 can include multiple antennas to communicate over frequencies associated with different cellular technologies. In at least some instances, base station 102 includes an array of single and/or multiband antennas for dual band communication. In this particular example, base station 102 is configured to communicate over the Cellular (Cell) and Personal Communication System (PCS) frequency bands. It is to be appreciated and understood, however, that other cellular frequency bands can be utilized in connection with the principles described herein.

Base station 102 provides cellular data and/or cellular voice service to one or more receivers, such as mobile station 104, in a cellular network. Typically, cellular service is provided to receivers that are known subscribers of wireless service of a network operator associated with base station 102. In some cases, however, cellular service may be provided to a receiver that is unknown to base station 102 or the network operator. To provide data and voice services, base station 102 may be connected to an IP network or backhaul link (not shown).

Mobile station 104 can comprise any suitable device such as by way of example and not limitation a cell phone, smart phone, cellular-enabled laptop, or wireless modem. Mobile station 104 may be configured to support a variety of wireless services including voice, voice over IP (VoIP), TCP/IP, wireless access protocol (WAP) and so on. In some cases, mobile station supports multiple cellular technologies and/or frequency bands for communication. In this particular example, mobile station 104 comprises a smart phone that is configured to communicate over the Cell and PCS frequency bands. It is to be appreciated and understood, however, that other cellular technologies and frequency bands can be utilized in connection with the principles described herein.

Base station 102 typically communicates with receivers, such as mobile station 104, over a communication link. In at least some instances, the receivers are mobile receivers that can move within a particular coverage area of base station 102. The communication link can comprise an uplink signal and a downlink signal. In this particular example, reference of signal direction is made with respect to mobile device 104. Therefore, in this example, the uplink signal is transmitted from mobile station 104 to base station 102 and the downlink signal transmitted from base station 102 to mobile station 104.

In some cases, uplink signals and downlink signals are communicated over non-overlapping frequencies of a frequency band. For instance, in this particular example, the uplink signal may occupy 824-849 MHz of the Cell band and the downlink signal may occupy 869-894 MHz of the Cell band. Additionally or alternately, the uplink signal may occupy 1850-1910 MHz of the PCS band and the downlink signal may occupy 1930-1991 MHz of the Cell band.

As long as the receivers and base station 102 are in range of each other, the communication link can be maintained. Although a range of base station 102 and/or a receiver may generally be a distance that a cellular signal can reach with sufficient strength, the range of either may also be affected by a variety of other factors. Factors that may affect a range of base station 102 include, by way of example, and not limitation, available transmit power for downlink transmissions, obstructions to receivers, signal fading, weather conditions, receiver traffic and volume, limitations of particular cellular technologies, proximity of other base stations, and so on. Factors that may affect a range of a receiver, such as mobile station 104, are movement of the receiver (direction, velocity, and/or acceleration), obstructions to a base station, available power for uplink transmissions, and weather, just to name a few.

In at least some cases, a range of a receiver may be extended by amplifying a downlink signal transmitted to the receiver from a base station. Alternately or additionally, in at least some cases, the range of a receiver may be increased by amplifying an uplink signal transmitted to a base station. For instance, in this particular example, the range of mobile receiver 104 may be increased by amplifying an uplink signal transmitted to base station 102. In such a case, the resulting increase in range may allow mobile station 104 to maintain communications with base station 102 at greater distances.

Adaptive range extender 106 is located proximate mobile station 104. In at least some embodiments, extender 106 can be connected to mobile station 104 either wirelessly or directly (not shown). Adaptive range extender 106 can receive uplink signals and/or downlink signals over one or more frequency bands. In at least some embodiments, adaptive range extender 106 can amplify the received uplink signals and/or amplify the received downlink signals. Alternately or additionally, in at least some embodiments, adaptive range extender 106 can transmit amplified uplink signals and/or amplified downlink signals. In at least some instances, adaptive range extender 106 can extend the range of a receiver by receiving, amplifying, and transmitting the amplified uplink and/or downlink signals.

For instance, in this particular example, adaptive range extender 106 can receive an uplink signal from mobile station 104, amplify the received uplink signal, and transmit the amplified uplink signal to base station 102 to extend the range of mobile station 104. Alternately or additionally, adaptive range extender 106 can receive a downlink signal from base station 102, amplify the received downlink signal, and transmit the amplified downlink signal to mobile station 104 to extend the range of mobile station 104. Having considered an example operating environment, consider now an example device that can extend a range of a receiver described above and below.

Example Device

Figure 2:
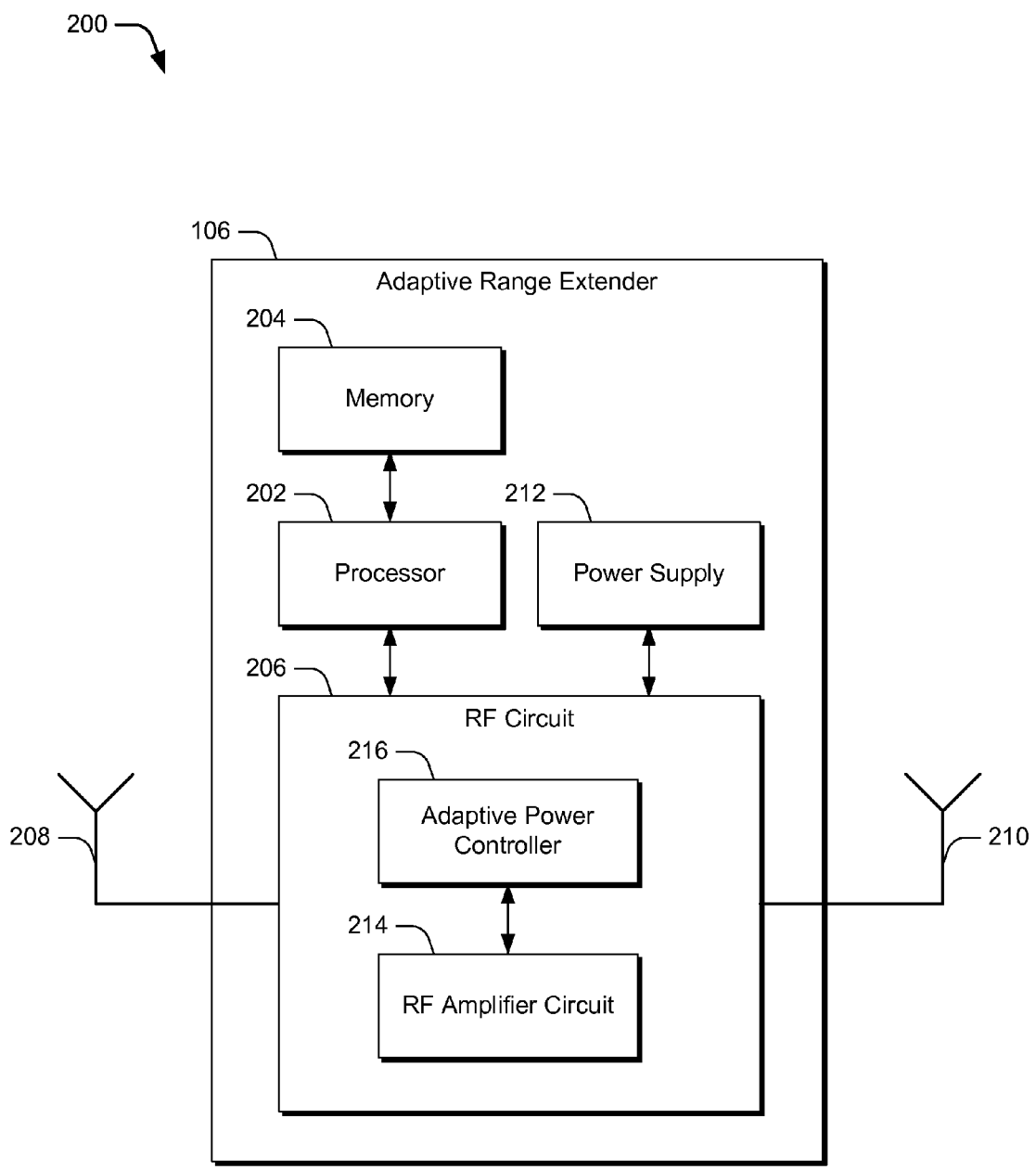
FIG. 2 illustrates an example device of FIG. 1 in accordance with one or more embodiments.

FIG. 2 illustrates adaptive range extender 106 in more detail in accordance with one or more embodiments generally at 200. In this example, adaptive range extender 106 includes a processor 202. Processor 202 may be any suitable processor such as a microprocessor, an embedded processor, or a PIC processor, just to name a few. In at least some embodiments, processor 202 may include input/output (I/O) logic, analog-to-digital I/O, digital-to-analog I/O, or any combination thereof. This I/O functionality may be integrated with processor 202 or provided by support chips operably coupled with processor 202 (not shown).

Processor 202 may be connected to memory 204 that may include any suitable type of storage device, such as RAM, ROM, EEPROM, NVRAM, low latency non-volatile memory such as flash, or other suitable types of computer-readable storage devices. Alternatively or additionally, in at least some embodiments, processor 202 and memory 204 may be combined as a System-on-Chip (SoC), application specific integrated-circuit (ASIC), or field programmable gate array (FPGA).

Adaptive range extender 106 also includes RF circuit 206. In this particular example, RF circuit 206 is connected to antenna 208 and antenna 210. Antenna 208 and/or antenna 210 may be multiple band antennas for transmitting and/or receiving signals over different frequencies. Alternately or additionally, in at least some embodiments, RF circuit 206 may connect to a port (not shown) suitable for connecting directly to a receiver. In such instances, an attenuator may be interposed between the port and the receiver to reduce power of signals transmitted to the receiver.

Adaptive range extender 106 further includes power supply 212 for powering various components such as processor 202 and RF circuit 206. Power supply 212 can comprise any suitable type of power supply such as switch-mode, linear, push-pull and so on. In at least some embodiments, power supply 212 may include multiple power supplies such as a switch-mode power supply to condition input power and a linear power supply to power RF circuit 206. Power supply 212 may also provide an indication of a load level on power supply 212. For example, in this particular example, power supply 212 can indicate a load level associated with providing power to RF circuit 206. In at least some embodiments, a load level on power supply 212 may indicate an oscillation in RF circuit 206.

Power supply 212 may be configured to operate over a wide range of input voltages. For example, power supply 212 may be a switch-mode power supply capable of receiving power over a range of voltages associated with vehicles and/or industrial environments such as 8V to 36V DC. In other instances, when input power is supplied from an AC/DC adapter, power supply 212 may only accept power over a narrow voltage range such as 12V to 15V.

RF amplifier circuit 214 of RF Circuit 206 may amplify signals received over antenna 208 and/or antenna 210. In at least some embodiments, the amplified signals may be transmitted via antenna 208 and/or antenna 210. RF circuit 206 may also include adaptive power controller 216. In some implementations, adaptive power controller 216 adjusts signal amplification by RF amplifier circuit 214. Adaptive power controller 216 may be implemented as hardware, firmware, software, or any combination thereof. For example, Adaptive power controller may include processor-executable instructions stored on memory 204 which cause processor 202 to act accordingly when executed. Adaptive power controller 216 will be described in more detail in relation to processes discussed below. It is to be appreciated and understood, however, that other amplifier circuit configurations can be utilized in connection with the principles described herein.

Various parameters associated with RF amplifier circuit 214 can be selected to provide desired operating characteristics. For example, frequency bands, output power, gain, and maximum input power can be selected to provide desired operating characteristics. Table 1. illustrates some example parameters.

TABLE 1

| Band | Uplink | Downlink |
|---|---|---|
| | Operating Frequency | |
| Band Class 0 | 824-849 MHz | 869-894 MHz |
| Band Class 1 | 1850-1910 MHz | 1930-1990 MHz |
| | Maximum Output Power | |
| Band Class 0 | 2 Watts/33 dBm | 0.1 mW/−10 dBm |
| Band Class 1 | 1 Watt/30 dBm | 0.1 mW/−10 dBm |
| | Gain (Step Size: <=1 dB) | |
| Band Class 0 | 40 dB | 40 dB |
| Band Class 1 | 40 dB | 40 dB |
| | Maximum Input Power | |
| Band Class 0 | 0 dBm | −20 dBm |
| Band Class 1 | 0 dBm | −20 dBm |

Figure 3:
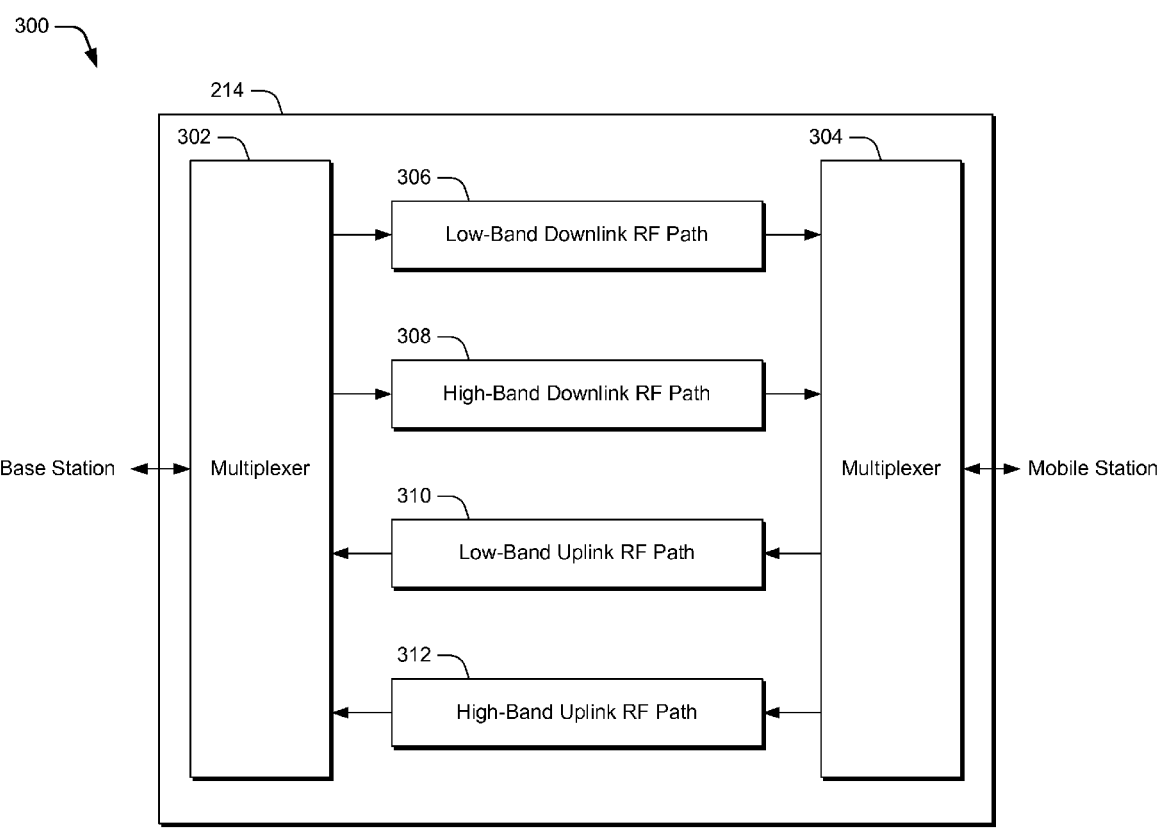
FIG. 3 illustrates an example hardware configuration in accordance with one or more embodiments.

Next, consider FIG. 3 which illustrates an example hardware configuration of RF amplifier circuit 214 in accordance with one or more embodiments generally at 300. In this particular example, RF amplifier circuit 214 includes multiplexers 302, 304 for separating and/or combining signals of difference frequencies. Although illustrated in FIG. 3 as multiplexers, multiplexer 302 and/or multiplexer 304 can be implemented using any suitable active or passive components such as, by way of example and not limitation, switches, diodes, diplexers, duplexers, quadplexers and/or quintplexers.

Multiplexers 302, 304 can separate a signal from a common feed into one or more signals of different frequencies. In at least some embodiments, the signals of different frequencies are uplink and downlink signals of a communication link. Alternately or additionally, in at least some embodiments, multiplexers 302, 304 can combine signals having different frequencies to a common feed. In this particular example, multiplexers 302, 304 can separate signals from a base station and mobile station into uplink and downlink signals of a given frequency band. For example multiplexers 302, 304 may separate Cell band and PCS band signals into their respective uplink and downlink signals.

RF amplifier circuit 214 may include one or more RF paths for amplifying a signal within a certain frequency range. As illustrated in FIG. 3, RF amplifier circuit 214 may include four RF paths 306-312 for amplifying uplink and downlink signals for dual band communication. In at least some embodiments, each RF path may be configured for a specific frequency range and/or gain. For instance, in this particular example, low-band downlink RF path 306 may be configured to amplify downlink signals from a base station, such as base station 102. In at least some embodiments, RF amplifier circuit 214 comprises four individual paths (e.g. bidirectional paths for two frequency bands), fed by quintplexers.

Figure 4:
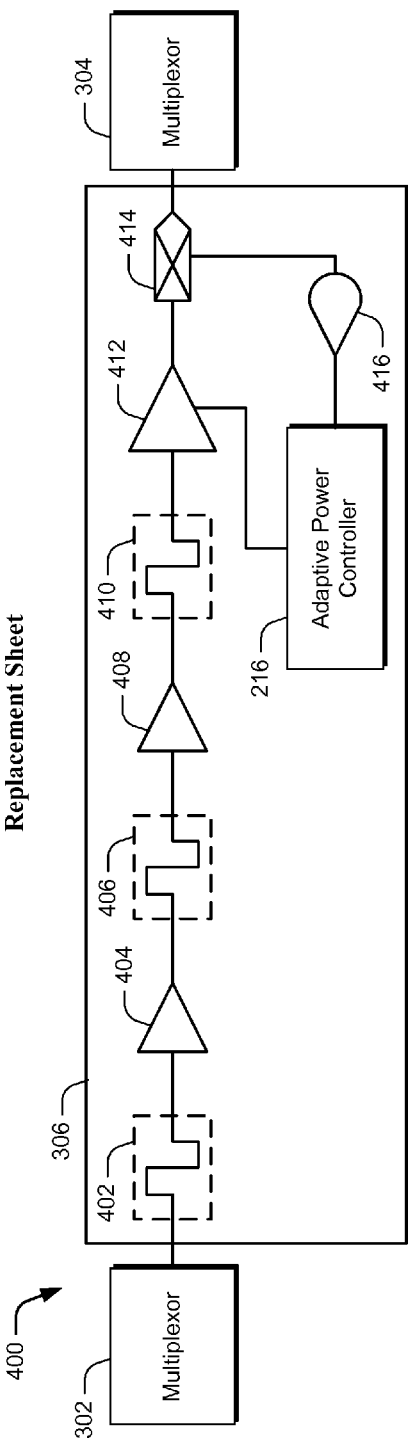
FIG. 4 illustrates some example components of the hardware configuration of FIG. 3 in accordance with one or more embodiments.

FIG. 4 illustrates some example components of low-band downlink RF path 306 (RF path 306) of FIG. 3 in accordance with one or more embodiments generally at 400. RF path 306 can include a variety of filters and amplifiers to condition and/or increase a magnitude of the downlink signal received from multiplexer 302. For instance, in this particular example, RF path 306 includes filter 402, amplifier 404, filter 406, amplifier 408, and filter 410 in a cascade configuration. Any suitable filter may be used including band-pass filters, pi filters, saw filters, and so on. Alternately or additionally, in at least some cases, amplifier 404 and amplifier 406 may be low-noise amplifiers (LNAs).

Variable gain amplifier 412 of RF path 306 can provide a range of amplification to the downlink signal. In at least some instances, a gain of variable gain amplifier 412 can be set by adaptive power controller 216. For example, in some embodiments, adaptive power controller 216 may utilize an analog output of a microcontroller to set or adjust the gain of variable gain amplifier 412. Alternately or additionally, in at least some embodiments, the output of the microcontroller may be digital outputs and/or digital output operably coupled with a digital-to-analog converter.

In at least some embodiments, variable gain amplifier 412 can amplify a downlink signal by as much as 30 dB to 40 dB. In some instances, a directional coupler 414 is interposed between variable gain amplifier 412 and multiplexer 304. Alternately, multiplexer 304 may be interposed between variable gain amplifier 412 and directional coupler 414 without departing from the spirit of concepts described herein.

Directional coupler 414 can provide a signal based on the amplified downlink signal to power meter 416. Additionally, in at least some embodiments, the signal provided by directional coupler 414 is an attenuated. In at least some embodiments, power meter 416 provides an indication of magnitude of the amplified downlink signal to adaptive power controller 216. In this particular example, adaptive power controller 216 is operably coupled to variable gain amplifier 412 and can adjust amplification of the downlink signal of RF link 306.

In at least some embodiments, adaptive power controller 216 can measure an RF power level of an amplified signal utilizing the output of power meter 416. For example, in at least some embodiments, adaptive power controller 216 may utilize an analog input of a microcontroller to measure the RF power level on the amplified signal. Alternately or additionally, in at least some embodiments, the input of the microcontroller may be digital and/or operable coupled with an analog-to-digital converter.

Figure 5:
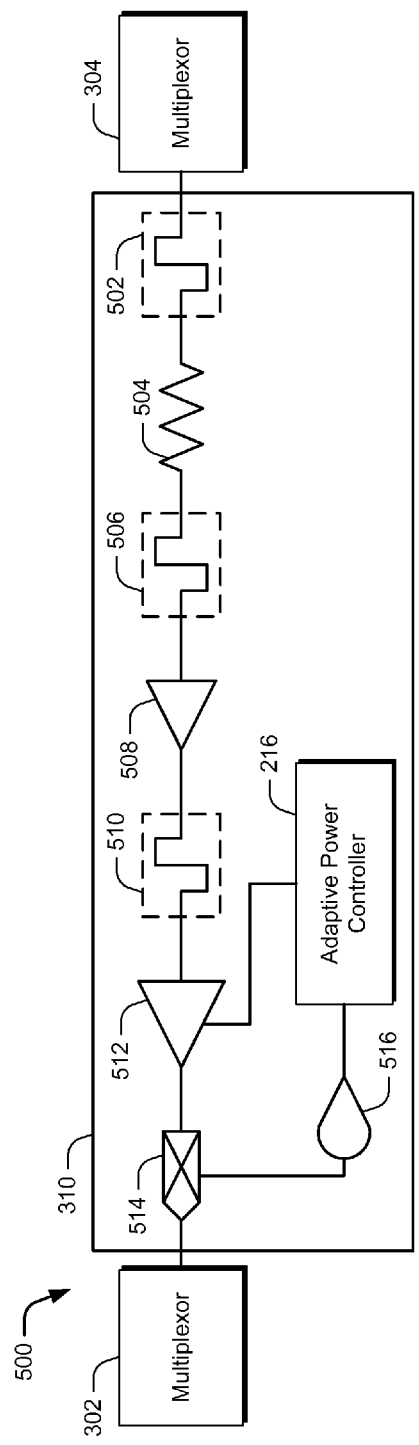
FIG. 5 illustrates some example components of the hardware configuration of FIG. 3 in accordance with one or more embodiments.

FIG. 5 illustrates some example components of low-band uplink RF path 310 (RF path 310) of FIG. 3 in accordance with one or more embodiments generally at 500. RF path 310 can include a variety of filters, attenuators, and amplifiers to condition and/or increase a magnitude of the uplink signal received from multiplexer 304. For instance, in this particular example, RF path 310 includes filter 502, attenuator 504, filter 506, amplifier 508, and filter 510 in a cascade configuration. Any suitable filter may be used including band-pass filters, pi filters, saw filters, and so on. Alternately or additionally, in at least some cases, amplifier 508 may be an LNA.

Variable gain amplifier 512 of RF path 310 can provide a range of amplification to the uplink signal. In at least some embodiments, variable gain amplifier 512 can amplify an uplink signal by as much as 30 dB to 40 dB. In some instances, a directional coupler 514 is interposed between variable gain amplifier 512 and multiplexer 302. Alternately, multiplexer 302 may be interposed between variable gain amplifier 512 and directional coupler 514 without departing from the spirit of concepts described herein.

Directional coupler 514 can provide a signal based on the amplified uplink signal to power meter 516. Additionally, in at least some embodiments, the signal provided by directional coupler 514 is an attenuated. In at least some embodiments, power meter 516 provides an indication of magnitude of the amplified uplink signal to adaptive power controller 216. In this particular example, adaptive power controller 216 is operably coupled to variable gain amplifier 512 and can adjust amplification of the uplink signal of RF link 310.

RF paths 308, 312 for high-band uplink and downlink signals may be implemented utilizing components similar to those shown in relation to the low-band RF paths 306, 310. Although illustrated as separate RF links for amplifying uplink and downlink signals, other embodiments may combine RF links, or portions thereof, by implementing bidirectional components. Having considered an example device, consider now one or more methods that can be implemented with the device described above and below.

Example Methods

Figure 6:
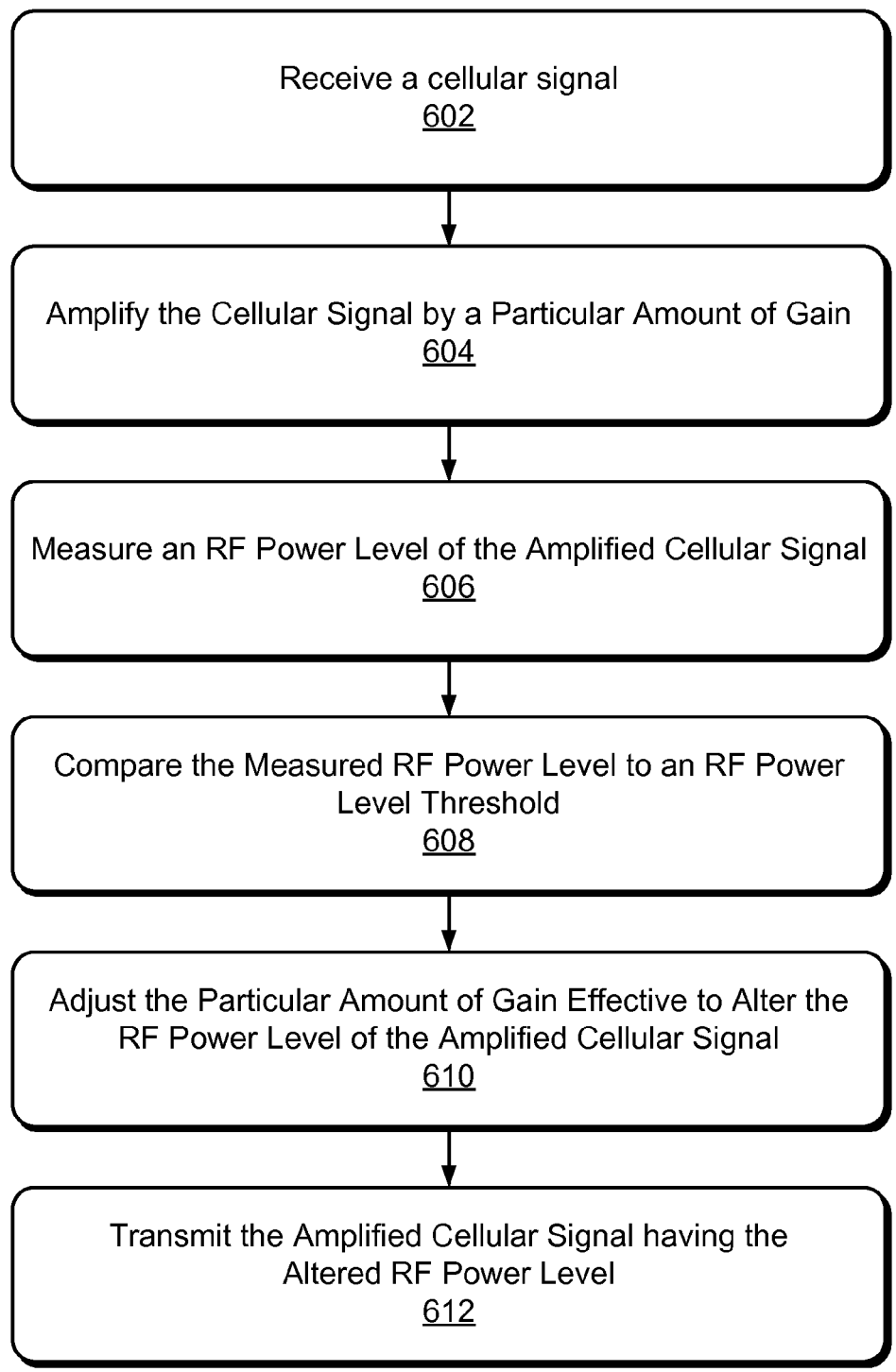
FIG. 6 is a flow diagram that illustrates steps in a method in accordance with one or more embodiments.

FIG. 6 is a flow diagram that describes steps in a method in accordance with one or more embodiments. The method can be implemented in connection with any suitable hardware, software, firmware, or combination thereof. The method can be implemented in connection with any systems such as those described above.

Step 602 receives a cellular signal. In at least some embodiments the cellular signal is a cellular uplink signal transmitted from a receiver. Alternately or additionally, in at least some embodiments the cellular signal is a downlink cellular signal. As an example, consider FIG. 1 which illustrates an example operating environment. In this example, adaptive range extender 106 can receive cellular uplink signals from mobile station 104 and/or cellular downlink signals from base station 102. In at least some embodiments, the received cellular signal is separated by frequency and/or directionality onto two or more RF paths.

Step 604 amplifies the cellular signal increasing the RF power of the cellular signal. In at least some cases, amplifying the cellular signal can increase a range of a receiver. The RF power of the amplified cellular signal may be limited in order to comply with regulatory rules. The cellular signal may be amplified with any suitable amplifier, such as those described above. In at least some instances, the cellular signal is amplified by an amount of initial gain. For instance in at least some embodiments, an initial gain setting for a cellular downlink signal may be about 10 dB. Alternately or additionally, an initial gain setting for a cellular uplink signal may be about 30 dB.

Step 606 measures an RF power level of an amplified cellular signal. In at least some embodiments a directional coupler may provide an RF signal for measurement. Alternately or additionally, in at least some embodiments, the directional couple is interposed between an adjustable gain amplifier and a multiplexer, and the RF power level is measured before the amplified cellular signal is combined with other cellular signals and/or frequency bands.

In at least some embodiments, RF power meter may convert an RF signal to a voltage indicating an RF power level. For example, consider FIG. 4 which illustrates an example RF downlink path. In this example, directional coupler 414 and RF power meter 416 may be utilized to provide an indication of an RF power level of the amplified cellular signal to adaptive power controller 216. In at least some embodiments, the RF power level measurement may be a log scale DC level.

Step 608 compares the measured RF power level of the amplified cellular signal to an RF power level threshold. In at least some embodiments the threshold may be a minimum and/or maximum transmission RF power level such as those described above. Alternately or additionally, thresholds may be set for detecting oscillations or other abnormalities in an amplifier circuit. In at least some instances, these thresholds may be set in order to mitigate or resolve oscillations. In the context of the current example, adaptive power controller 216 can compare a measured RF power level with one or more power level thresholds.

Alternately or additionally, in at least some embodiments, the measured RF power level may be compared to a threshold based on another compared RF power level to verify link balance. For instance, if a measured downlink RF power level exceeds a threshold, an uplink RF power level can be compared to a threshold to detect a link imbalance between the downlink and uplink signals. In some cases, a detected link imbalance can result in a fault condition and/or gain reductions until the link is balanced.

Optionally, step 608 may ascertain a load on a power supply associated with amplifying the cellular signal in response to the measured RF power level exceeding an RF power threshold for oscillation detection. For example, consider FIG. 2 which illustrates an example device in detail. In this example, adaptive power controller 216 may ascertain a load on power supply 212.

Step 610 adjusts the particular amount of gain applied to the cellular signal effective to alter the RF power level of the amplified cellular signal. In at least some embodiments, step 610 adjusts the gain by a particular amount based on the comparison of the measured RF power level and the RF power level threshold. Adjusting the gain may include adjusting a variable gain amplifier and/or a variable attenuator. For example, consider FIG. 4 and FIG. 5 illustrating example components of RF paths 306 and 310. In these particular examples, adaptive power controller 216 may adjust a gain setting of variable gain amplifier 412 and/or a gain setting of variable gain amplifier 512.

Alternately or additionally, in at least some embodiments, the RF power level of the amplified cellular signal is altered by less than 1 dB. In some cases, altering the RF power level of the amplified cellular signal by less than 1 dB reduces disruptions and link imbalances. In some implementations, the RF power level of the amplified signal is altered by about 0.85 dB to 0.95 dB. In at least some embodiments, a resolution of a digital-to-analog output may affect a resolution of an adjustment to the RF power level of the amplified signal. Alternately or additionally, in at least some embodiments, a dB/volt resolution of a variable gain amplifier may affect a resolution of an adjustment to the RF power level of the amplified signal. Thus, in some implementations, the RF power level of the amplified signal may be altered by about 0.5 dB to 1 dB.

Adjusting the RF power level of the amplified signal allows a range of a receiver to be increased without disrupting communications. For example, consider FIG. 1 in which mobile station 104 may be moving relative to base station 102. As mobile station 104 moves, adaptive range extender 106 can make small gain adjustments to uplink and/or downlink signals to mitigate link imbalances.

Step 610 may adjust gain applied to the cellular single over very short time intervals. For instance, in at least some implementations, gain adjustments based on measured RF power may take less than 500 microseconds. Alternately or additionally, gain adjustments may be made to four separate RF paths in less than 550 milliseconds or to two separate RF paths in less than 275 milliseconds. In some implementations, timing of the gain adjustments may vary depending on a clock speed of a processor and/or a power meter reaction time, such as processor 202 and/or power meter 416 respectively.

In at least some embodiments, adaptive power controller 216 embodied on a processor may execute instructions configured to perform steps 606, 608, and/or 610. Alternately or additionally, in at least some embodiments, the processor may execute instructions configured to perform steps 606, 608, and/or 610 for multiple RF paths (e.g. the four RF paths 306-312 of RF amplifier circuit 214).

In at least some instances, quickly adjusting gain can improve the range of a receiver. For example, consider mobile station 104 and adaptive range extender 106 of FIG. 1. In this particular example, mobile station 104 receiver may encounter obstacles or terrain compromising a communication link with base station 102. Adaptive range extender 106 may quickly adjust gain of an amplified uplink signal of mobile station 104 before base station 102 drops the communication link due to the compromised communication link. Alternately or additionally, in at least some embodiments, quickly adjusting gain of more than one RF path may improve range and/or performance of a receiver. In the context of the above example, adjusting gain of an amplified uplink signal and an amplified downlink signal between base station 102 and mobile station 104 may extend a range of mobile station 104, balance the communication link, and/or mitigate interference with other mobile stations.

Step 612 transmits the amplified cellular signal having the altered RF power level. In at least some embodiments, the amplified cellular signal having the altered RF power level is a cellular uplink signal transmitted to a base station. Alternately or additionally, the amplified cellular signal having the altered RF power level is a cellular downlink signal transmitted to a base station. In some cases, the cellular downlink signal is transmitted via an inductive loop antenna.

Figure 7:
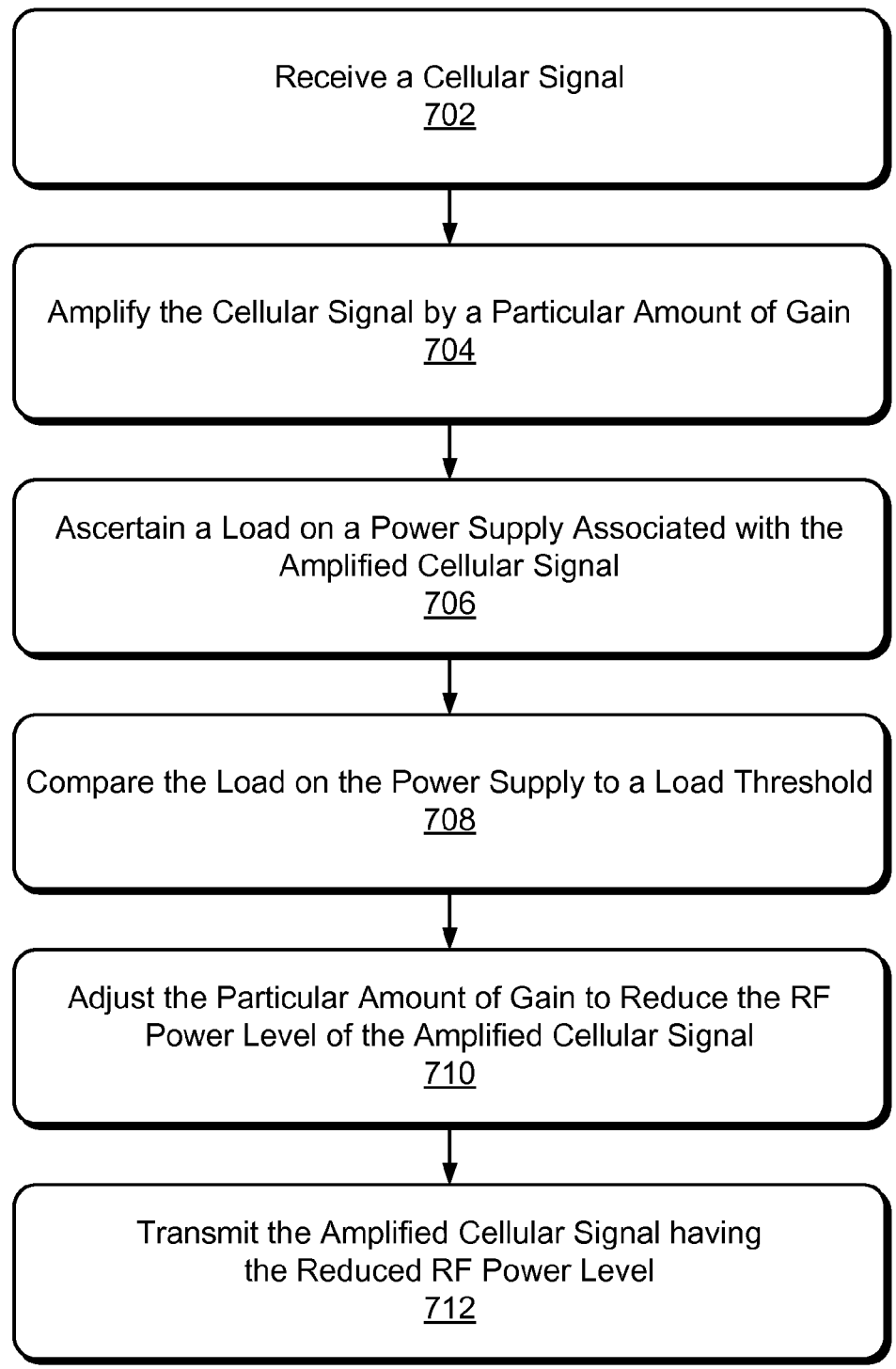
FIG. 7 is a flow diagram that illustrates steps in a method in accordance with one or more embodiments.

Now consider FIG. 7, which is a flow diagram that describes steps in a method in accordance with one or more embodiments. The method can be implemented in connection with any suitable hardware, software, firmware, or combination thereof. The method can be implemented in connection with any systems such as those described above.

Step 702 receives a cellular signal. In at least some embodiments the cellular signal may be a cellular uplink signal transmitted from a receiver. Alternately or additionally, in at least some embodiments the cellular signal may be a downlink cellular signal. As an example, consider FIG. 1 which illustrates an example operating environment. In this example, adaptive range extender 106 can receive cellular uplink signals from mobile station 104 and/or cellular downlink signals from base station 102.

Step 704 amplifies the cellular signal increasing the RF power of the cellular signal. In at least some cases, amplifying the cellular signal can increase a range of a receiver. The cellular signal may be amplified with any suitable amplifier, such as those described above.

Step 706 ascertains a load on a power supply associated with amplifying the cellular signal. For example, adaptive power controller 216 may ascertain a load on power supply 212. In at least some embodiments, step 706 ascertains the load on the power supply in response to the measured RF power level of an RF path exceeding an RF power level threshold. Alternately or additionally, step 706 may ascertain the load on the power supply in response to measured RF power levels of two or more RF paths exceeding their respective RF power level thresholds. In at least some embodiments, the load on the power supply is measured in response to measured RF power levels of an uplink RF path and a downlink RF path exceeding certain thresholds. Alternately or additionally, in at least some embodiments, step 706 may be in response to two or more measurements of RF power levels on four individual RF paths.

For example, consider FIG. 3 which illustrates an example hardware configuration. In this example, a load on a power supply may be ascertained by adaptive power controller 216 in response to determining that RF power levels of low-band downlink RF path 306 and low-band uplink RF path 310 exceed their respective RF power level thresholds. In at least some embodiments, RF power level thresholds can be set to detect possible oscillations of an amplified RF path. For instance, in the context of the present example, an RF power level threshold for an amplified cellular downlink signal may be set at a maximum downlink transmission level and the RF power level threshold for an amplified cellular uplink signal may be set at approximately 60% of a maximum uplink transmission level.

Step 708 compares the load on the power supply with a power supply load threshold. In at least some embodiments, the power supply load threshold can be set to detect hardware abnormalities and/or oscillation. In the context of the above example, a power supply power threshold for power supply 212 may be set from about 1.6 A to about 2.0 A. In some instances the power supply threshold may be set according to a specific configuration of an RF amplifier circuit.

In at least some embodiments, the load on the power supply is compared to a power supply threshold for a given measured RF power level of an amplified signal. Additionally or alternately, in at least some embodiments, the power supply threshold is based on expected current loads associated with a proper uplink and downlink RF power levels. In some implementations, power supply thresholds corresponding to a respective range of proper uplink and downlink RF power levels can be established to detect hardware abnormalities and/or amplifier oscillation. In at least some embodiments, step 708 is effective to validate amplifier stability by verifying an amount of current provided by the power supply is below a current threshold based on an RF power level of an uplink and/or downlink signal.

Step 710 adjusts the gain applied to the cellular signal effective to alter the RF power level of the amplified cellular signal. In at least some embodiments, step 710 adjusts the gain by a particular amount based on the comparison of the load on the power supply with the load power supply threshold. Alternately or additionally, in at least some embodiments, the gain is adjusted based on the measured RF power level of the amplified cellular signal. In at least some embodiments, adjusting the gain may include adjusting a variable gain amplifier and/or a variable attenuator.

Alternately or additionally, in at least some embodiments, the RF power level of the amplified cellular signal is altered by 10 dB or more. In some cases, reducing the RF power level of the amplified cellular signal by 10 dB or more can prevent hardware damage and/or resolve oscillations. For example, adaptive power controller 216 can adjust a gain setting of amplifier 412 to prevent damage to RF downlink path 306. Optionally, in at least some embodiments, a power supply and/or an RF circuit may be disabled if repeated gain adjustments fail to resolve hardware abnormalities such as high current draws. For example, adaptive power controller 216 may disable a liner power supply component (not shown) of power supply 212 when gain adjustments do not alleviate an excessive load on power supply 212.

Step 710 may adjust gain applied to the cellular single over very short time intervals. For instance, in at least some implementations, gain adjustments based on the comparison of the load on the power supply with the power supply load threshold may take less than 500 microseconds. In some instances, quickly adjusting gain can mitigate oscillations and/or prevent hardware damage. For example, consider mobile station 104 and adaptive range extender 106 of FIG. 1. In this particular example, an RF amplifier circuit of adaptive range extender 106 may begin to oscillate while amplifying a communication link of mobile station 104. Adaptive power controller 216 may quickly reduce gain of an amplified cellular uplink signal of mobile station 104 before components of the RF amplifier circuit are damaged.

Step 712 transmits the amplified cellular signal having the altered RF power level. In at least some embodiments, the amplified cellular signal having the altered RF power level is a cellular uplink signal transmitted to a base station. Alternately or additionally, the amplified cellular signal having the altered RF power level is a cellular downlink signal transmitted to a base station.

Conclusion

In one or more embodiments, a cellular signal is received and amplified by a particular amount of gain. A power level of the amplified cellular signal is measured and compared to a power level threshold. The particular amount of gain is adjusted based on the comparison to alter the power level of the amplified cellular signal by less than 1 dB. The cellular signal having the altered power level is then transmitted.

In other embodiments, a cellular signal is received and amplified by a particular amount of gain. A load on a power supply associated with the amplified cellular signal is ascertained and the load on the power supply is compared to a power supply load threshold. The particular amount of gain is then adjusted based the comparison of the load on the power supply and the power supply load threshold.

Although subject matter has been described in language specific to structural features and/or methodological acts, it is to be appreciated and understood that the subject matter defined in the appended claims is not necessarily limited to the specific features or acts described above. Rather, the specific features and acts described above are disclosed as example forms of implementing the claims.

What is claimed is:

1. A method comprising:

receiving, from a cellular base station, a cellular downlink signal;

amplifying the cellular downlink signal with a first adjustable gain amplifier by a first amount of gain to provide an amplified cellular downlink signal;

measuring, with a first RF power meter, a downlink radio frequency (RF) power level of the amplified cellular downlink signal before the amplified cellular downlink signal is combined with other cellular downlink signals for transmission to a mobile station;

receiving, from the mobile station, a cellular uplink signal;

amplifying the cellular uplink signal with a second adjustable gain amplifier by a second amount of gain to provide an amplified cellular uplink signal;

measuring, with a second RF power meter, an uplink RF power level of the amplified cellular uplink signal before the amplified cellular uplink signal is combined with other uplink signals for transmission to the cellular base station;

ascertaining a current load level of a power supply that provides power to the first adjustable gain amplifier and the second adjustable gain amplifier;

comparing the downlink RF power level with a downlink RF power level threshold, the uplink RF power level with an uplink RF power level threshold, and the current load level of the power supply with a current load level threshold; and determining, when the downlink RF power level, the uplink RF power level, and current load level of the power supply exceed their respective thresholds, that oscillation is present in a circuit comprising the first adjustable gain amplifier and the second adjustable gain amplifier;

decreasing, responsive to determining that the oscillation is present in the circuit, the first amount of gain by which the cellular downlink signal is amplified and the second amount of gain by which the cellular uplink signal is amplified until the oscillation is mitigated; or determining, when at least one of the downlink RF power level, the uplink RF power level, and current load level of the power supply do not exceed their respective thresholds that the oscillation is not present in the circuit; and adjusting, responsive to determining that the oscillation is not present in the circuit and based on the downlink RF power level threshold or the uplink RF power level threshold, the first amount of gain by which the cellular downlink signal is amplified or the second amount of gain by which the cellular uplink signal is amplified.

2. The method as recited in claim 1, wherein an amount of time elapsing between measuring the downlink RF power level or the uplink RF power level and adjusting or decreasing the amount of gain by which the respective signals are amplified is less than 500 microseconds.

3. The method as recited in claim 1, wherein an amount of time elapsing between measuring the downlink RF power level or the uplink RF power level and adjusting or decreasing the amount of gain by which the respective signals are amplified is less than 500 milliseconds.

4. The method as recited in claim 1, wherein:

the downlink RF power level threshold is a minimum downlink RF power level threshold or a maximum downlink RF power level threshold; and the uplink RF power level threshold is a minimum uplink RF power level threshold or a maximum uplink RF power level threshold.

5. The method as recited in claim 4, wherein measuring the downlink RF power level or measuring the uplink RF power level includes sampling a log scale voltage level of an RF power meter.

6. The method as recited in claim 1, wherein adjusting or decreasing the first amount of gain or the second amount of gain includes adjusting one or more variable gain amplifiers or one or more variable attenuators.

7. A system comprising:

a processor; and computer-readable storage media including instructions, that, when executed by the processor, cause the processor to perform one or more operations effective to:

amplify a cellular downlink signal with a first adjustable gain amplifier by a first amount of gain to provide an amplified cellular downlink signal, the cellular downlink signal received from a cellular base station;

measure, via a first radio frequency (RF) power meter, a downlink RF power level of an amplified cellular downlink signal before the amplified cellular downlink signal is combined with other cellular downlink signals for transmission to a mobile station;

amplify a cellular uplink signal with a second adjustable gain amplifier by a second amount of gain to provide an amplified cellular uplink signal, the cellular uplink signal received from the mobile station;

measure, via a second RF power meter, an uplink RF power level of the amplified cellular uplink signal before the amplified cellular uplink signal is combined with other uplink signals for transmission to the cellular base station;

ascertain a current load level of a power supply that provides power to the first adjustable gain amplifier and the second adjustable gain amplifier;

compare the downlink RF power level with a downlink RF power level threshold, the uplink RF power level with an uplink RF power level threshold, and the current load level of the power supply with a current load level threshold; and determine, when the downlink RF power level, the uplink RF power level, and current load level of the power supply exceed their respective thresholds, that oscillation is present in a circuit comprising the first adjustable gain amplifier and the second adjustable gain amplifier;

decrease, responsive to determining that the oscillation is present in the circuit, the first amount of gain by which the cellular downlink signal is amplified and the second amount of gain by which the cellular uplink signal is amplified until the oscillation is mitigated; or determine, when at least one of the downlink RF power level, the uplink RF power level, and current load level of the power supply do not exceed their respective thresholds that the oscillation is not present in the circuit; and adjust, responsive to determining that the oscillation is not present in the circuit and based on the downlink RF power level threshold or the uplink RF power level threshold, the first amount of gain by which the cellular downlink signal is amplified or the second amount of gain by which the cellular uplink signal is amplified.

8. The system of claim 7, wherein the downlink RF power level threshold is a minimum or maximum downlink RF power level threshold, and the uplink RF power level threshold is a minimum or maximum uplink RF power level threshold.

9. The system of claim 7, wherein the RF power level of the amplified cellular uplink signal or the amplified cellular downlink signal is altered by between about 0.85dB and about 0.95 dB.

10. The system of claim 7, wherein an amount of time elapsing between the operations effective to measure the downlink RF power level or the uplink RF power level and the operations effective to adjust or decrease the first amount of gain or the second amount of gain is less than 500 microseconds.

11. One or more computer-readable storage devices comprising processor-executable instructions that, responsive to execution by a processor operably associated with the one or more computer-readable storage devices, implement an adaptive range extender to:

amplify a cellular downlink signal with a first adjustable gain amplifier by a first amount of gain to provide an amplified cellular downlink signal, the cellular signal received from a cellular base station via radio frequency (RF) interface;

measure, with a first RF power meter, a downlink RF power level of the amplified cellular downlink signal before the amplified cellular downlink signal is combined with other cellular signals for transmission to a mobile station;

amplify a cellular uplink signal with a second adjustable gain amplifier by a second amount of gain to provide an amplified cellular uplink signal, the cellular uplink signal received from the mobile station;

measure, via a second RF power meter, an uplink RF power level of the amplified cellular uplink signal before the amplified cellular uplink signal is combined with other uplink signals for transmission to the cellular base station;

ascertain a current load level of a power supply that provides power to the first adjustable gain amplifier and the second adjustable gain amplifier;

compare the downlink RF power level with a downlink RF power level threshold, the uplink RF power level with an uplink RF power level threshold, and the current load level of the power supply with a current load level threshold; and determine, when the downlink RF power level, the uplink RF power level, and current load level of the power supply exceed their respective thresholds, that oscillation is present in a circuit comprising the first adjustable gain amplifier and the second adjustable gain amplifier;

decrease, responsive to determining that the oscillation is present in the circuit, the first amount of gain by which the cellular downlink signal is amplified and the second amount of gain by which the cellular uplink signal is amplified until the oscillation is mitigated; or determine, when at least one of the downlink RF power level, the uplink RF power level, and current load level of the power supply do not exceed their respective thresholds that the oscillation is not present in the circuit; and adjust, responsive to determining that the oscillation is not present in the circuit and based on the downlink RF power level threshold or the uplink RF power level threshold, the first amount of gain by which the cellular downlink signal is amplified or the second amount of gain by which the cellular uplink signal is amplified.

12. The one or more computer-readable storage devices as recited in claim 11, wherein an amount of time elapsing between the operations effective to measure the downlink RF power level or the uplink RF power level and the operations effective to adjust or decrease the first amount of gain or the second amount of gain is less than 500 microseconds.

13. The one or more computer-readable storage devices as recited in claim 11, wherein an amount of time elapsing between the operations effective to measure downlink RF power level or the uplink RF power level and the operations effective to adjust or decrease the first amount of gain or the second amount of gain is less than 500 milliseconds.

14. The one or more computer-readable storage devices as recited in claim 11, wherein the adaptive range extender is further implemented to:

transmit the amplified cellular uplink signal to the cellular base station; and transmit the amplified cellular downlink signal to the mobile station.

15. The one or more computer-readable storage devices as recited in claim 11, wherein the RF power level of the amplified cellular downlink signal or the amplified cellular uplink signal is altered by between about 0.85 dB and about 0.95 dB.

16. The one or more computer-readable storage devices as recited in claim 11, wherein:
   the downlink RF power level threshold is a minimum downlink RF power level threshold or a maximum downlink RF power level threshold; and
   the uplink RF power level threshold is a minimum uplink RF power level threshold or a maximum uplink RF power level threshold.

17. The one or more computer-readable storage devices as recited in claim 16, wherein the operations effective to measure the downlink RF power level or the uplink RF power level includes sampling a log scale voltage level of an RF power meter.

* * * * *